May 26, 1959

H. E. BITTNER 2,887,730

BIRD PROOFING DEVICE

Filed Nov. 26, 1954

Inventor
Harry Edward Bittner
By Charles L. Lovercheck
Attorney

2,887,730
BIRD PROOFING DEVICE

Harry Edward Bittner, Waterford Township, Erie County, Pa.

Application November 26, 1954, Serial No. 471,143

1 Claim. (Cl. 20—1)

This invention relates to bird proofing of buildings and more particuliarly to means for preventing birds from roosting on cornices and other parts of buildings.

Birds such as pigeons have become a nuisance on various parts of building structures in their nesting and other habits thereon and it has become a problem to keep them from nesting and roosting on buildings. Various methods have been devised for preventing the birds from roosting on buildings but none of them have been satisfactory and yet permanent.

It is, accordingly, an object of this invention to provide a permanent bird proofing device for use on building structures.

Another object of the invention is to provide a flexible piece of material which can be permanently attached to a building structure to prevent birds from roosting thereon.

Another object of this invention is to provide a bird proofing means for buildings which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
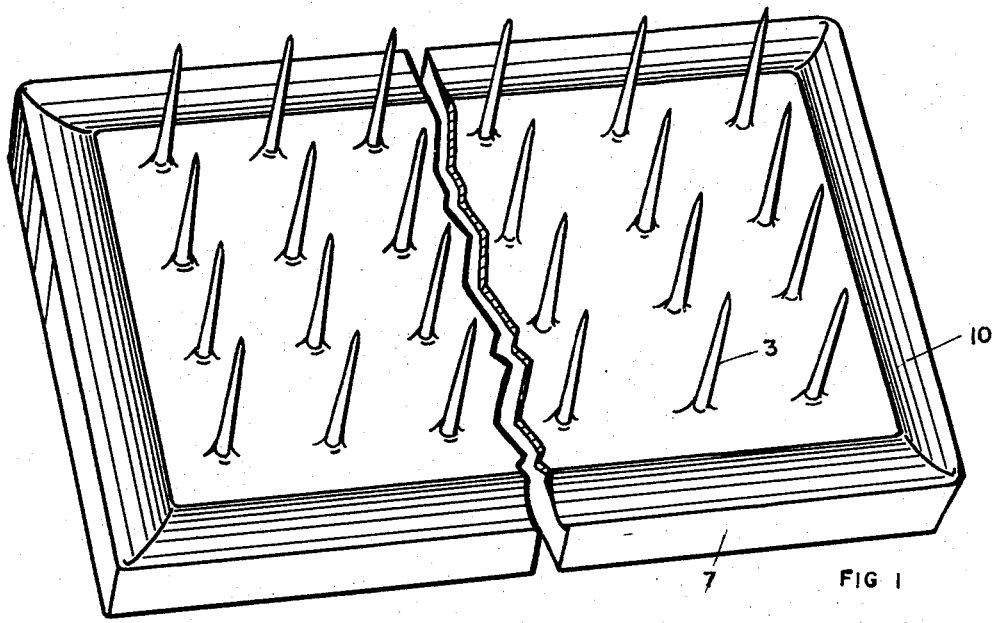
Fig. 1 is a perspective view of a bird proofing device according to the invention.
Figure 2:
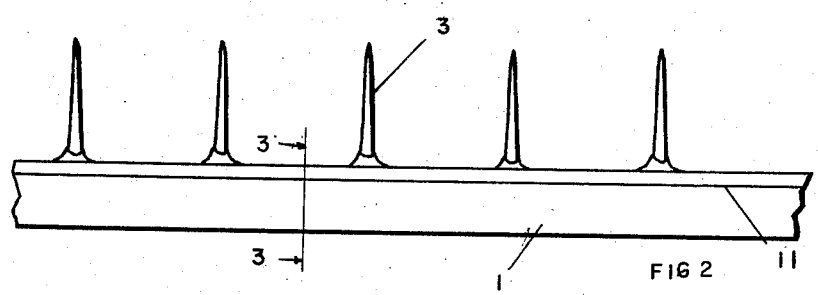
Fig. 2 is a side view of the bird proofing device shown in Fig. 1.
Figure 3:
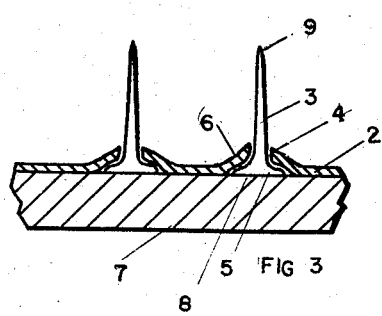
Fig. 3 is a cross sectional view taken on line 3—3 of Fig. 2.

Now with more specific reference to the drawing, a bird proofing device 1 is shown made up of a sheet 2 of flexible material such as tar paper having nails 3 forced therethrough through holes 4, the heads 5 thereof causing the flexible material 2 to slope upwardly at 6, forming a convex surface to shed rain water and to brace the nails 3 in a vertical position. The flexible material 2 rests against the backing member 7 at 8 and has a lesser area than the area of the backing member 7 and the backing member extends therefrom to provide a marginal portion. The nails 3 have points 9 which extend upward and form unpleasant landing areas for birds. The nails 3 may be spaced any desired distance but are preferably spaced about one and one-half inches so that a common size bird such as a pigeon cannot comfortably rest therebetween. The backing member 7 may be made of a flat plate like rigid member such as a wooden plank having an area greater than the area of the sheet 2. It will be noted that the cementing material 10 is sloped downwardly to form a tapered surface with the outer edge of the flexible member 2.

To use the bird proofing device disclosed herein, the tar paper having the nails 3 extending therethrough and assembled to the backing member 7 as disclosed is attached to the cornice of the building to be protected and may be cemented thereto by means of tar or other fastening means. The bird proofing material thus attached will last indefinitely on the building and be effective in preventing birds from roosting thereon. I preferably make the strips of flexible material 2 approximately six inches wide so that by cementing the edges down, the flexible member 2 will be effective in adhering to the plank. These six inch strips also are of convenient size for attaching to cornices or other portions of buildings.

The foregoing specification sets forth the invention in its preferred practical forms but the structure shown is capable of modification within a range of equivalents without departing from the invention which is to be understood is commensurate with the appended claim.

The embodiments of the invention in which an exclusive property or privilege is claimed are defined as follows:

A bird proofing device made up into a unitary member adapted to be attached to an exposed surface on a building to prevent birds from resting thereon comprising a backing member, said backing member consisting of a flat plate like, relatively rigid member, a sheet of tar paper of slightly lesser area than one side of said platelike member disposed on said backing member and coextensive with a part of one side thereof and leaving a marginal surface of said backing member exposed around the edges of said tar paper sheet, spaced nails, said nails extending through said tar paper sheet and having their heads resting on said backing member between said tar paper sheet and said backing member, said tar paper sheet adjacent said nails on the opposite side therefrom, said tar paper sheet being forced outwardly and extending along said nails providing a water deflecting area thereon, and tar on the marginal edges of said backing member around the edges of said tar paper sheet forming a continuation of the edges of said tar paper sheet and attaching said tar paper sheet to said backing member.

References Cited in the file of this patent
UNITED STATES PATENTS

| | | |
|---|---|---|
| 168,446 | Blodget | Oct. 5, 1875 |
| 1,996,894 | Alvord | Apr. 9, 1935 |
| 2,475,047 | Peles | July 5, 1949 |

FOREIGN PATENTS

| | | |
|---|---|---|
| 626,848 | France | May 21, 1927 |
| 622,372 | Great Britain | May 2, 1949 |
| 668,965 | Great Britain | Mar. 26, 1952 |